United States Patent [19]
Ohta et al.

[11] Patent Number: 5,183,026
[45] Date of Patent: Feb. 2, 1993

[54] METHOD AND APPARATUS FOR DRESSING AN ANGULAR GRINDING WHEEL

[75] Inventors: Norio Ohta, Okazaki; Yukio Oda, Kariya; Toshiaki Naya, Chiryu; Tomoyuki Kasuga, Kariya, all of Japan

[73] Assignee: Toyoda Koki Kabushiki Kaisha, Kariya, Japan

[21] Appl. No.: 852,566

[22] Filed: Mar. 17, 1992

[30] Foreign Application Priority Data

Mar. 28, 1991 [JP] Japan .................................. 3-64353

[51] Int. Cl.$^5$ .......................... B24B 53/06; B24B 53/08
[52] U.S. Cl. .................................. 125/11.16; 125/11.04; 125/11.15; 51/5 D; 51/165.87; 51/165.88
[58] Field of Search .............. 125/11.01, 11.04, 11.13, 125/11.15, 11.16, 11.21, 11.23; 51/5 D, 165.87, 165.88

[56] References Cited

U.S. PATENT DOCUMENTS

| | | | |
|---|---|---|---|
| 4,219,972 | 9/1980 | Ota et al. | 51/5 D |
| 4,502,125 | 2/1985 | Yoneda et al. | 51/165.88 X |
| 4,539,779 | 9/1985 | Donner | 51/165.88 X |
| 4,571,891 | 2/1986 | Donner | 51/165.87 |
| 4,584,796 | 4/1986 | Yoneda et al. | 51/165.87 X |

FOREIGN PATENT DOCUMENTS

| | | | |
|---|---|---|---|
| 0077450 | 5/1983 | Japan | 51/165.87 |
| 0167765 | 8/1985 | Japan | 125/11.13 |

*Primary Examiner*—Bruce M. Kisliuk
*Assistant Examiner*—John A. Marlott
*Attorney, Agent, or Firm*—Oblon, Spivak, McClelland, Maier & Neustadt

[57] ABSTRACT

A grinding machine having an angular type grinding wheel and a dressing apparatus therefor. The grinding wheel is formed with first and second grinding surfaces usable for grinding a cylindrical surface and shoulder end surface of a workpiece, respectively, and first and second reference surfaces parallel to the first and second grinding surfaces, respectively. The positions of the first and second reference surfaces and the first and second grinding surfaces are detected with touch bars before each dressing operation so as to obtain a first distance between the first grinding surface and first reference surface, and a second distance between the second grinding surface and second reference surface. After that, a first dressing amount for dressing the first grinding surface and a second dressing amount for dressing the second grinding surface are so determined that the first distance and the second distance would have a predetermined constant relationship after dressing operation. The first grinding surface is then dressed by the first dressing amount, while the second grinding surface is dressed by the second dressing amount.

6 Claims, 8 Drawing Sheets

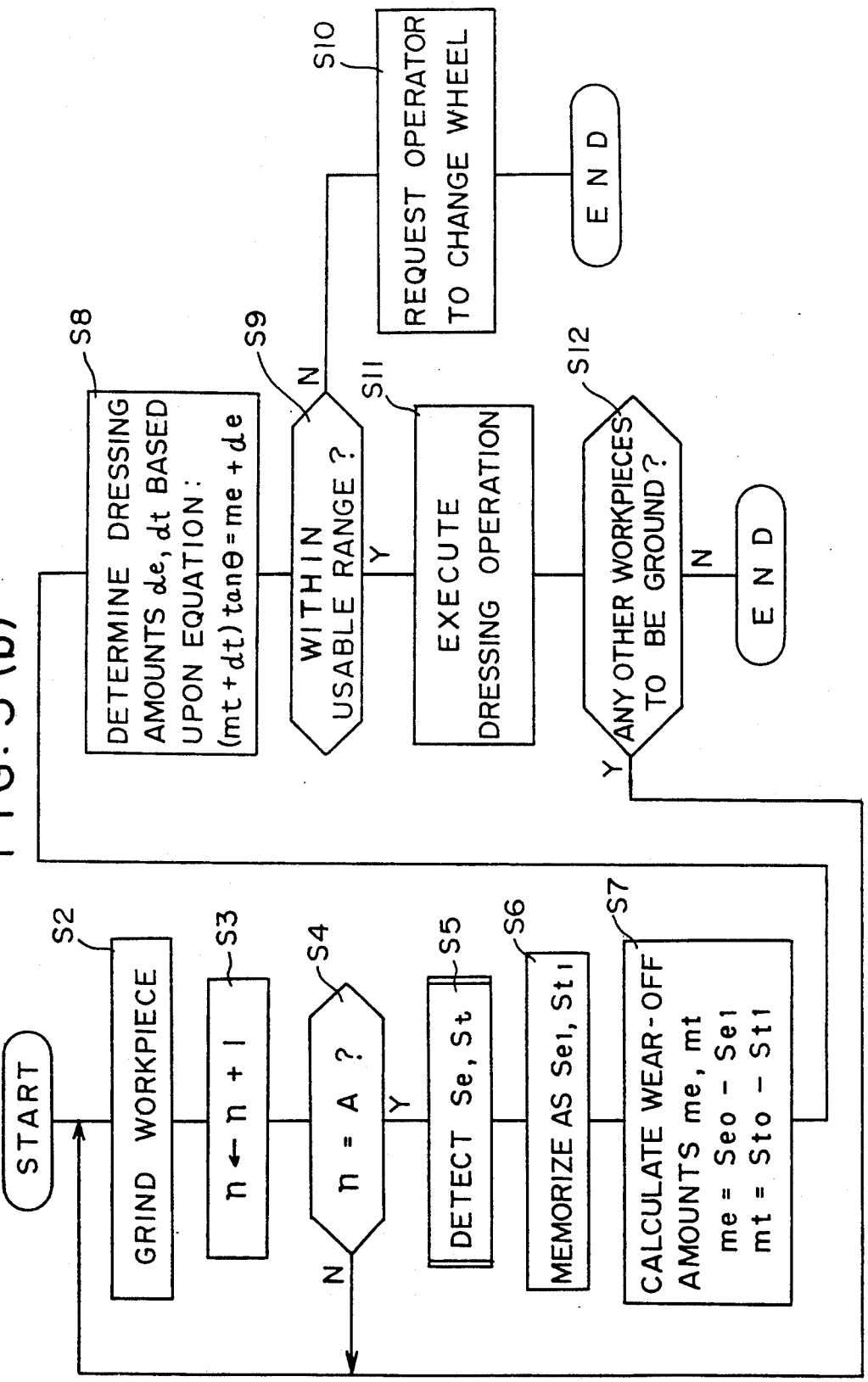

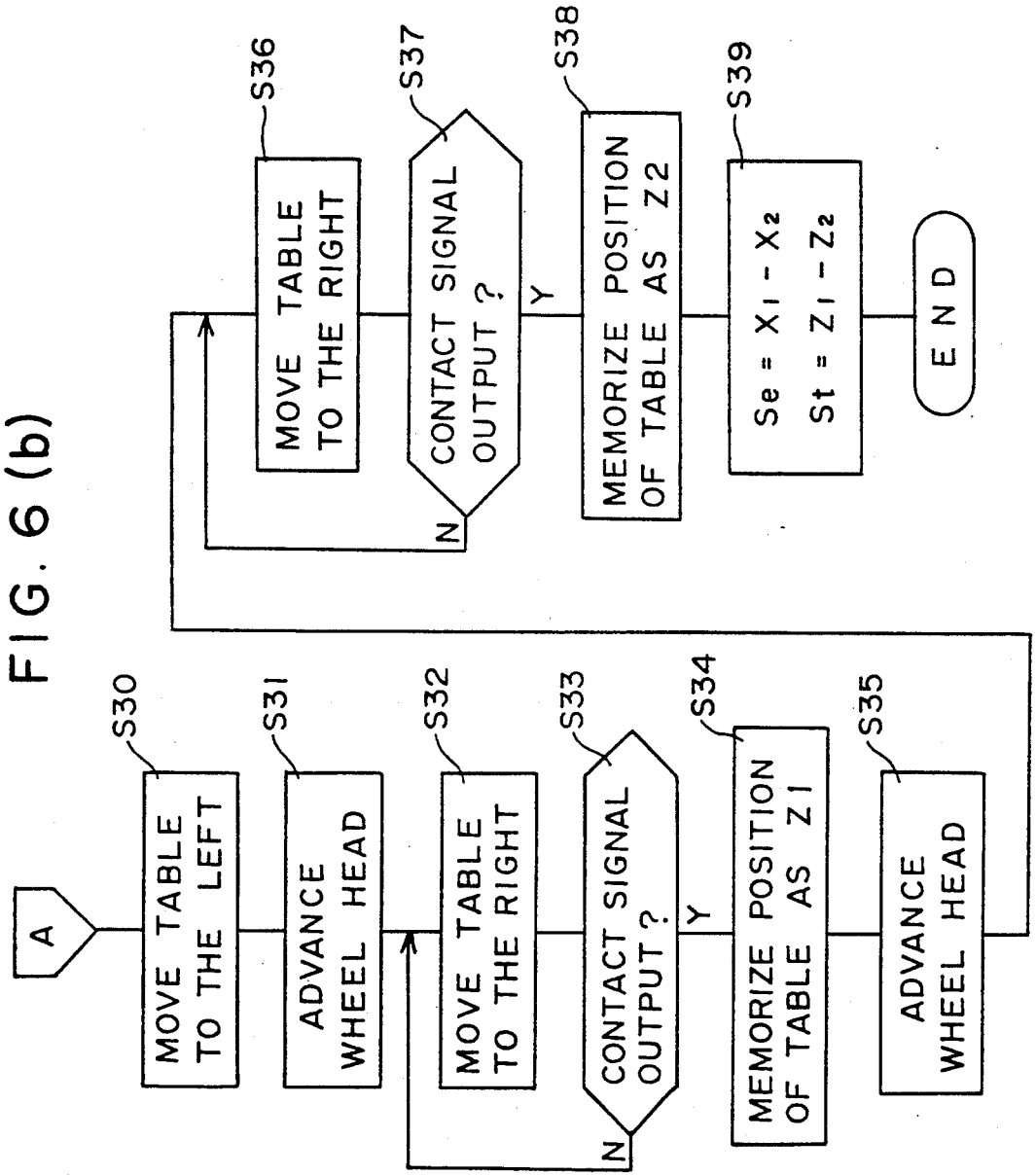

METHOD AND APPARATUS FOR DRESSING AN ANGULAR GRINDING WHEEL

BACKGROUND OF THE INVENTION

1. Field of the Invention

This invention relates to a method and apparatus for dressing an angular grinding wheel having a first grinding surface usable for grinding a cylindrical surface of a workpiece and a second grinding surface perpendicularly intersecting the first grinding surface and usable for grinding a shoulder end surface of the workpiece.

2. Description of the Background Art

An angular type grinding wheel G has a first grinding surface Ga and a second grinding surface Gb perpendicularly intersecting the first grinding surface Ga, as shown in FIG. 1, so as to simultaneously grind a cylindrical surface and a shoulder end surface of a workpiece.

Conventionally, the first and second grinding surfaces Ga, Gb of the grinding wheel G are dressed using a touch detection device which is provided with an AE sensor (Acoustic Emission Sensor) for detecting the positions of the first and second grinding surfaces Ga, Gb, respectively. Namely, a dressing tool is firstly advanced toward the first grinding surface Ga until the contact between the dressing tool and the first grinding surface is detected by the touch detection device. The dressing tool is then fed into the first grinding surface Ga by a few microns so as to dress the first grinding surface Ga. The second grinding surface Gb is also dressed in the same manner.

In grinding operation, the first and second grinding surfaces Ga, Gb wear down differently, because a cylindrical surface and shoulder end surface of a workpiece have different removal amounts to be ground, respectively and they are ground under different grinding conditions, respectively. Therefore, during grinding operation, the position of top portion Gp of the grinding wheel gradually deviates from the reference plane RP in which the top portion Gp initially lay, as indicated by a broken line L1 in FIG. 1.

Accordingly, when the first and second grinding surfaces Ga, Gb are respectively dressed by predetermined dressing amounts dt and de with the worn first and second grinding surfaces being used as reference positions, the grinding wheel would have a shape indicated by a broken line L2 after such dressing operation. Namely, the position of the top portion Gp has deviated from the reference plane RP toward the second grinding surface Gb by an amount of S.

In grinding operation, the relative position between the grinding wheel G and a workpiece W is controlled under the assumption that the top portion Gp of the grinding wheel G always lies in the reference plane RP. Namely, when both of a cylindrical surface W1 and a shoulder end surface W2 of a workpiece W are ground, the relative position of the grinding wheel G with respect to the workpiece W is so controlled that the reference plane RP passes the corner C between the cylindrical surface W1 and the shoulder end surface W2 of the workpiece W, as shown in FIG. 2. The grinding wheel G is then advanced toward the workpiece W in an inclined direction parallel to the reference plane RP. Accordingly, in the event that the top portion of the grinding wheel G has deviated from the reference plane RP toward the second grinding surface Gb, the shoulder end surface W2 is excessively ground when the cylindrical surface W1 is ground to a desired dimension.

Further, since the width of the second grinding surface Gb becomes smaller each time when the dressing operation is carried out, the width thereof eventually becomes smaller than that of the shoulder end surface W2. In such case, part of the shoulder end surface W2 cannot be ground by the second grinding surface Gb.

SUMMARY OF THE INVENTION

Accordingly, it is an object of the present invention to provide an improved method and apparatus for dressing an angular grinding wheel in which the top portion of the grinding wheel is prevented from deviating from its original position.

Briefly, in the present invention, a grinding wheel is formed with first and second grinding surfaces usable for grinding a cylindrical surface and shoulder end surface of a workpiece, respectively, and first and second reference surfaces parallel to the first and second grinding surfaces, respectively. The positions of the first and second reference surfaces and the first and second grinding surfaces are detected so as to obtain a first distance between the first grinding surface and the first reference surface, and a second distance between the second grinding surface and the second reference surface. After that, a first dressing amount for dressing the first grinding surface and a second dressing amount for dressing the second grinding surface are so determined that the first distance and the second distance would have a predetermined constant relationship after dressing operation. The first grinding surface is then removed by the first dressing amount, while the second grinding surface is removed by the second dress amount.

With this dressing operation, the top portion of the grinding wheel lies within a reference plane event after dressing operation, and does not deviate from the reference plane. Accordingly, shoulder end surfaces of workpieces can always be ground properly.

BRIEF DESCRIPTION OF DRAWINGS

Various other objects, features and many of the attendant advantages of the present invention will be readily appreciated as the same becomes better understood by reference to the following detailed description of the preferred embodiments when considered in connection with the accompanying drawings, in which:

FIGS. 5(a) and 5(b) are flow charts showing the operation of the CPU shown in FIG. 3;

FIGS. 6(a) and 6(b) are flow charts showing the detail process at steps S0 and S5 of FIGS. 5(a), 5(b)

DETAILED DESCRIPTION OF PREFERRED EMBODIMENTS

Figure 1:
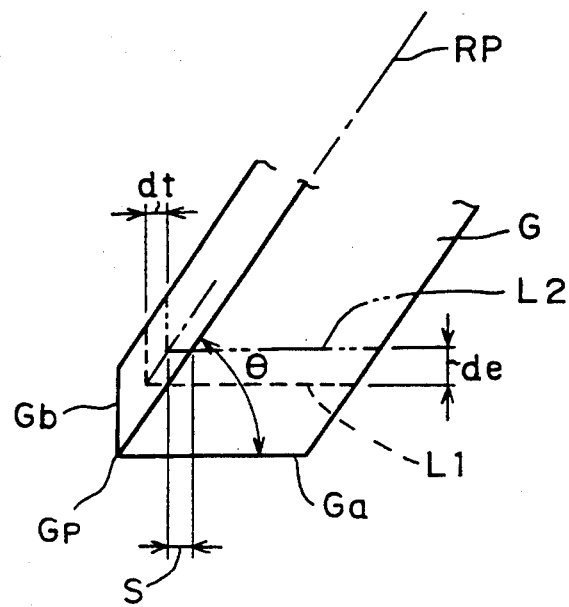
FIG. 1 is an explanation chart showing a change in the shape of an angular grinding wheel.
Figure 2:
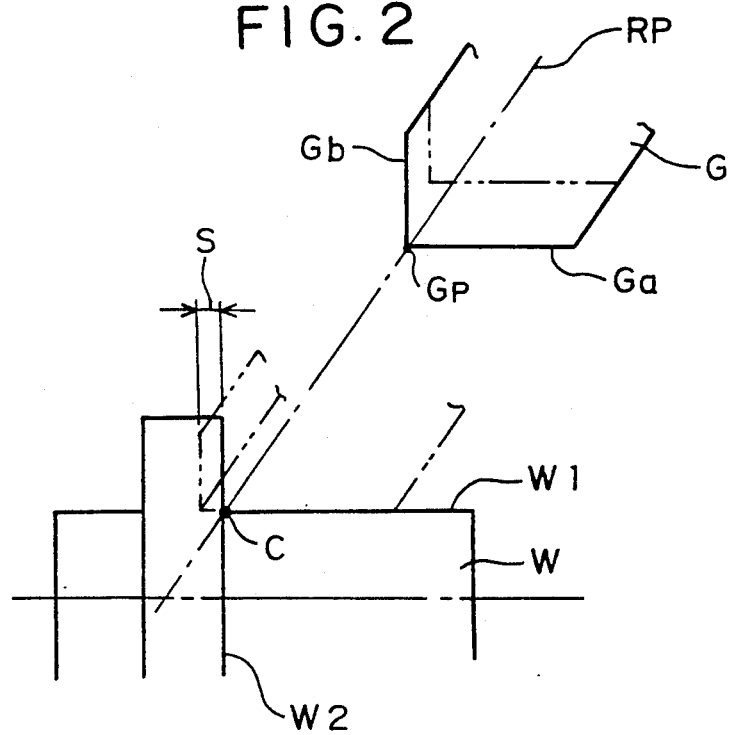
FIG. 2 is an explanation chart showing a positional relationship between an angular grinding wheel and a workpiece having a cylindrical surface and a shoulder end surface to be ground.
Figure 3:
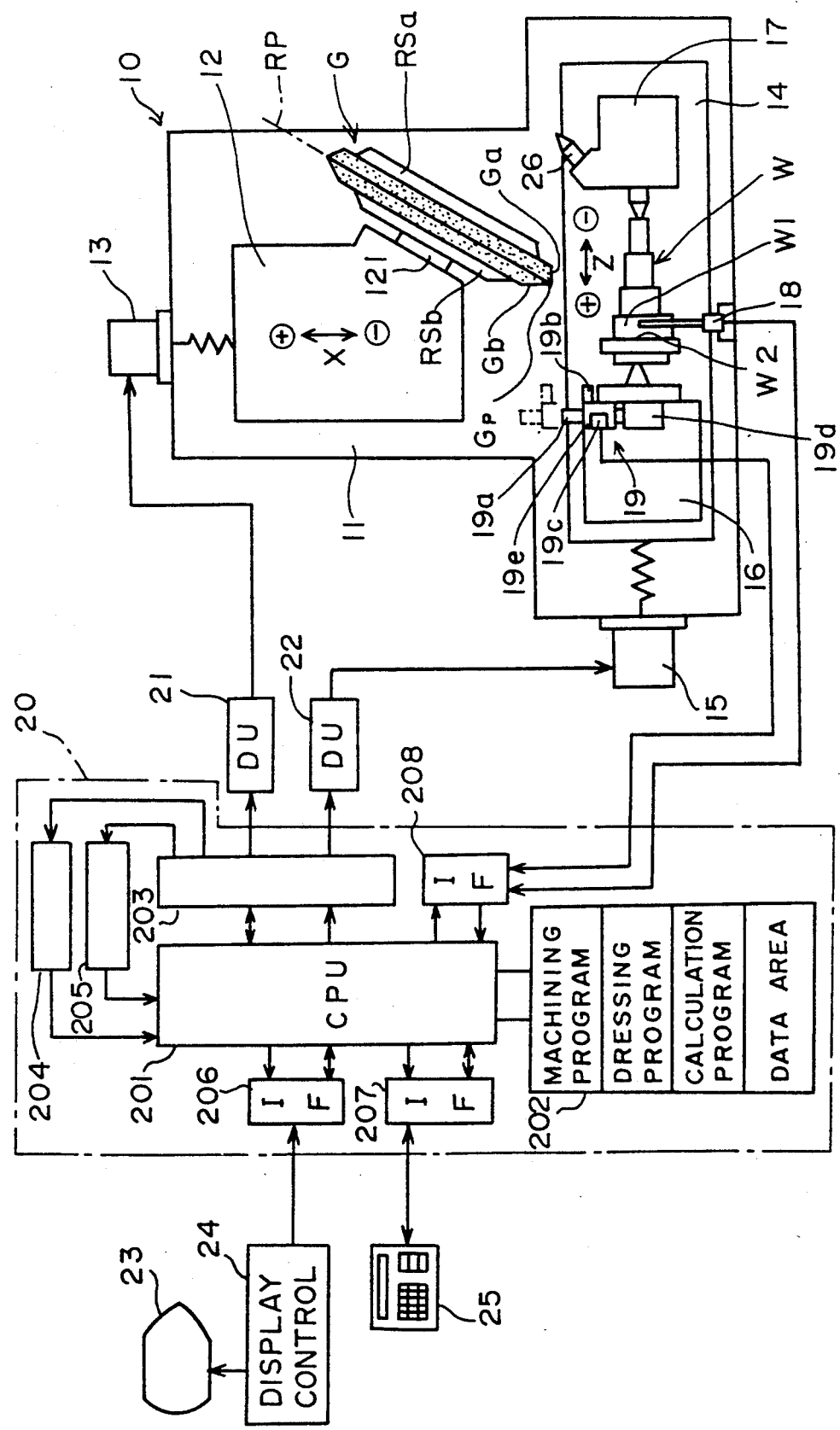
FIG. 3 is a schematic chart of a grinding machine which is provided with a dressing apparatus according to a first embodiment of the present invention.

The first embodiment of the present invention will now be explained with reference to FIGS. 3, 4, 5(a), 5(b), 6 (a) and 6(b). FIG. 3 shows the entire structure of a grinding machine in which numeral 10 denotes the machine portion thereof and numeral 20 denotes the controller portion thereof. The machine portion 10 of the grinding machine is provided with a wheel head 12 and a table 14 which are guided on a bed 11. Namely, the wheel head 12 is guided on the bed 11 for movement in an X-axis direction and moved by a servomotor 13, while the table 14 is guided on the bed for movement in a Z-axis direction perpendicularly intersecting the X-axis direction and moved by a servomotor 15.

Mounted on the table 14 are a spindle head 16 and a tail stock 17 which support a workpiece W therebetween through centers for rotation about a main spindle axis parallel to the Z-axis direction. The workpiece W has a cylindrical surface W1 and a shoulder end surface W2 to be ground.

A grinding wheel G of angular type, which is composed of a core portion and an abrasive layer containing CBN grains, is carried on the wheel head 12 through a wheel shaft 121 to be rotated by a wheel motor (not shown). The grinding wheel G has a first grinding surface Ga parallel to the main spindle axis and a second grinding surface Gb perpendicularly intersecting the first grinding surface Ga. Further, the grinding wheel G is provided with a first reference surface RSa parallel to the first grinding surface Ga and a second reference surface RSb parallel to the second grinding surface Gb. These reference surfaces RSa and RSb are formed on the core portion of the grinding wheel G, and would intersect each other at the reference plane RP, in which the top portion Gp of the grinding wheel G lies, if the reference surfaces RSa and RSb were extended toward the reference plane RP.

The machine portion 10 is further provided with a diameter measuring device 18 for measuring the diameter of the cylindrical portion W1 of the workpiece W, a dressing tool 26 mounted on the tail stock 17 and a touch detection device 19 mounted on the spindle head 16. The touch detection device 19 is composed of a head 19e, a first touch bar 19a which is attached to the head 19e and is engagable with the first grinding surface Ga and first reference surface RSa, a second touch bar 19b which is attached to the head 19e and is engagable with the second grinding surface Gb and second reference surface RSb, an AE (Acoustic Emission) sensor 19c for detecting the contact of the first and second touch bars 19a and 19b with the above mentioned surfaces, and a cylinder 19d for moving the head 19e. During grinding operation, the touch bars 19a and 19b are located at the positions indicated by a solid line in FIG. 3, while they are moved to their advanced positions, which are indicated by a broken line in FIG. 3, before each dressing operation.

The controller portion 20 of the grinding machine is mainly composed of a central processing unit (hereinafter referred to as CPU) 201, memory 202, pulse distribution circuit 203, a counter 204 for detecting the present position of the wheel head 12, a counter 205 for detecting the present position of the table 14, and interface circuits 206, 207 and 208. Command pulses output from the pulse distribution circuit 203 are fed to drive circuits 21 and 22 which drive the servomotors 13 and 15, respectively, while the command pulses are also fed to the counters 204, 205, respectively.

A display device 23 such as CRT and a display control circuit 24 are connected to the interface circuit 206, a data input device 25 for inputting program, data and the like is connected to the interface circuit 207, and the diameter measuring device 18 and the AE sensor 19c of the touch detection device 19 are connected to the interface circuit 208.

The memory 202 is provided with a memory area for storing machining program, a memory area for storing a dressing program, a memory area for storing a calculation program for calculating dressing amounts for dressing operation, and a memory area for storing various data.

Figure 4:
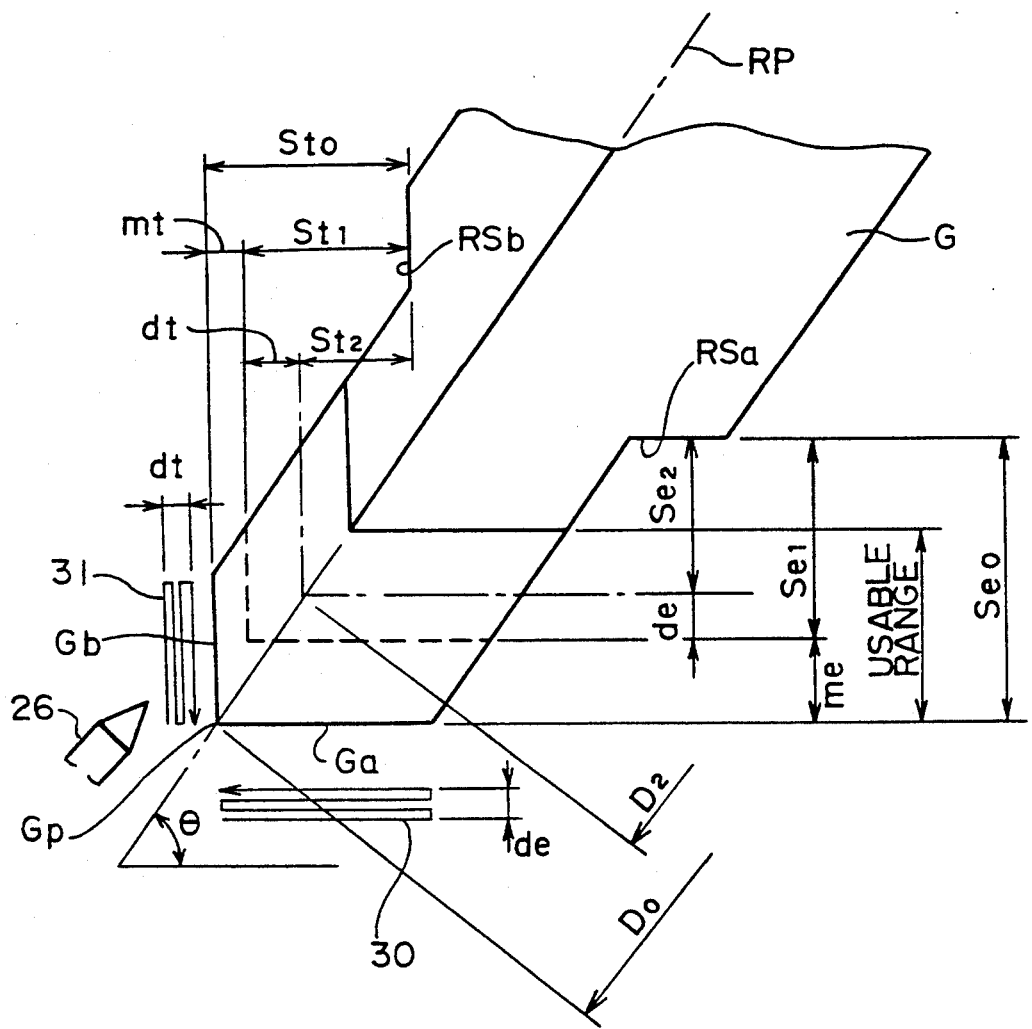
FIG. 4 is an explanation chart illustrating a dressing operation for dressing an angular grinding wheel.
Figure 5A:
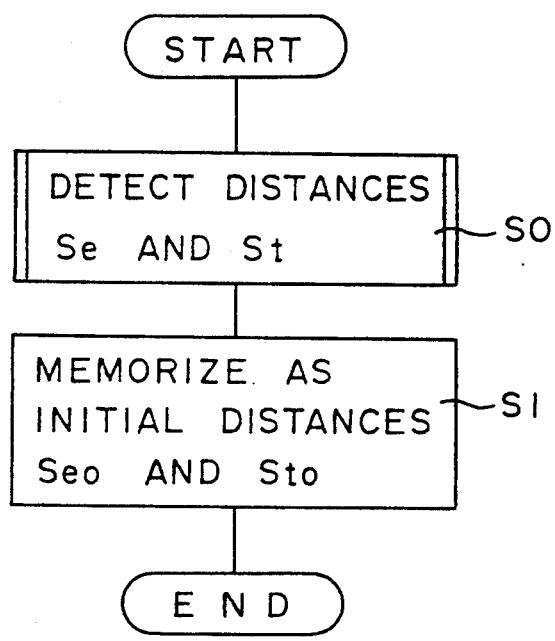

The operation of the controller will now be explained with reference to FIGS. 4, 5 (a), 5 (b), 6 (a) and 6 (b).

Operation When a New Wheel is Used

When a new grinding wheel is attached to the wheel head 12, the operation shown in FIG. 5 (a) is executed. Namely, at step S0, a first distance Se in the X-axis direction between the first grinding surface Ga and the first reference surface RSa, and a second distance St in the Z-axis direction between the second grinding surface Gb and the second reference surface RSb are detected. At step S1, these distances Se and St are memorized in the memory 202 as initial first distance $Se_0$ and initial second distance $St_0$, respectively.

Figure 6A:
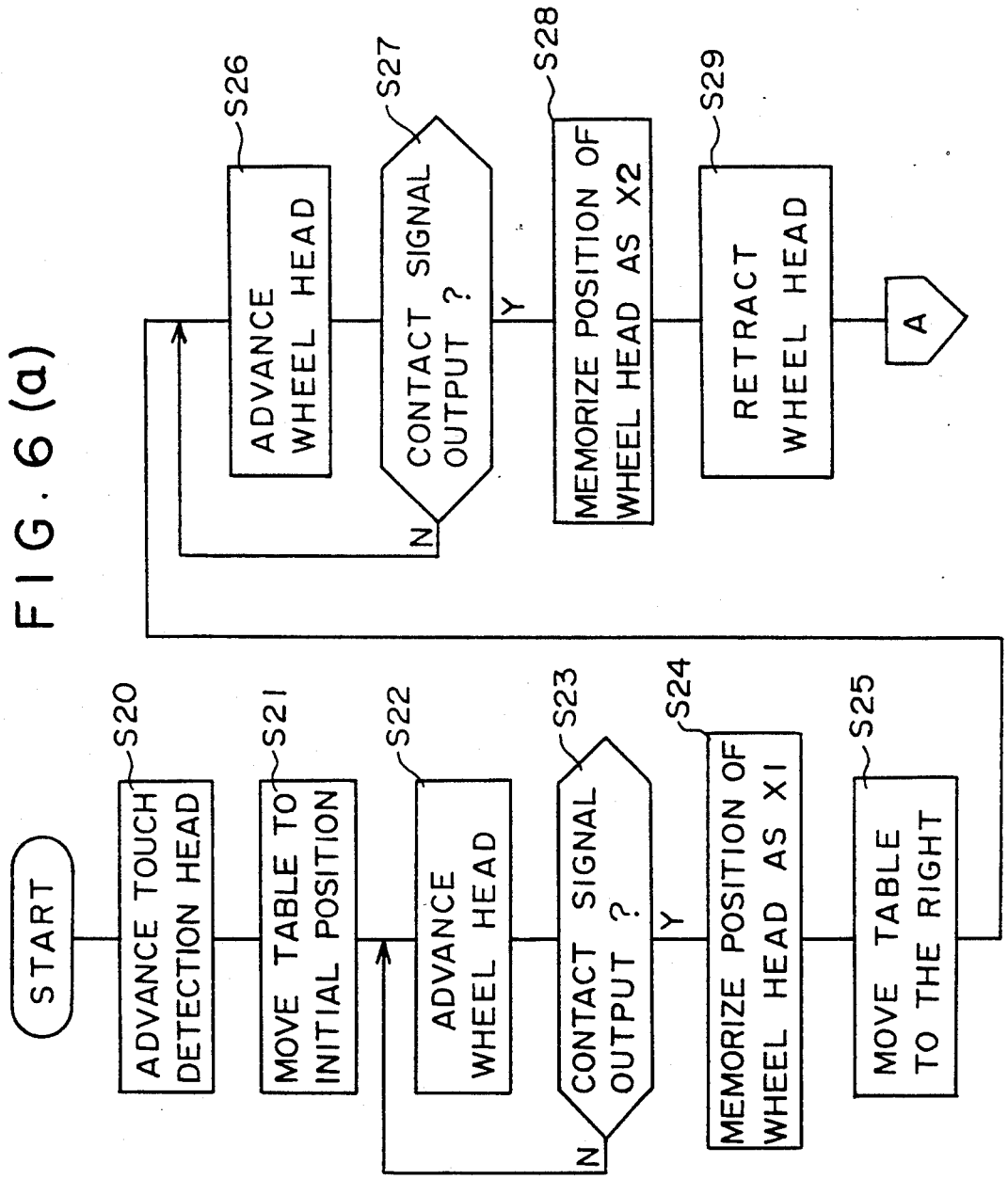

The detailed process at step S0 is shown in FIGS. 6 (a) and 6 (b). At first step S20, the CPU 201 outputs a command signal to a hydraulic control circuit (not shown) so as to move the touch bars 19a and 19b to their advanced positions. After that, the CPU 201 outputs a command signal to the pulse distribution circuit 203, at step S21, for moving the table 14. In response to this command, the pulse distribution circuit 203 outputs Z-axis pulse signals which are transmitted to the drive circuit 22 so that the servomotor 15 is rotated in accordance with the pulse signals. With this operation, the table 14 is moved to an initial Z-axis position at which the first touch bar 19a faces the first grinding surface Ga of the grinding wheel G. After that, the CPU 21 outputs a command signal to the pulse distribution circuit 203 for advancing the wheel head 12, at step S22. In response to this command, the pulse distribution circuit 203 outputs minus X-axis pulse signals which are transmitted to the drive circuit 21 so that the servomotor 13 is rotated in accordance with the pulse signals. With this operation, the wheel head 12 is advanced, and the present position of the wheel head 12 is detected by the counter 204.

At next step S23, it is judged based on the output signal from the AE sensor 19c whether or not the first grinding surface Ga has contacted with the first touch bar 19a. When it is judged that the first grinding surface Ga has not contacted with the first touch bar 19a yet, the process moves back to step S22 to continue the advance movement of the wheel head 12. When it is judged that the first grinding surface Ga has contacted with the first touch bar 19a, the process moves from step S23 to step S24 at which the movement of the wheel head 12 is stopped, and the present position of the wheel head 12 is then memorized in the data area of the memory 202 as position data X1 indicating the position of the first grinding surface Ga.

At next step S25, the CPU 201 again outputs a command signal to the pulse distribution circuit 203 to move the table 14 to such a Z-axis position at which the first touch bar 19a faces the first reference surface RSa of the grinding wheel G. After that, the wheel head 12 is advanced by the process at steps 26 and 27 until the first reference surface RSa contacts with the first touch bar 19a. When the first reference surface RSa contacts with 19a, the process moves from step S27 to step S28 at which the movement of the wheel head 12 is stopped, and the present position of the wheel head 12 is then memorized as position data X2 indicating the position of the first reference surface RSa. At step S29, the wheel head 12 is moved back to the retracted position, and the table 14 is then moved to the left at step S30 in FIG. 6 (b) until the second touch bar 19b moves across the first grinding surface Ga.

After that, the wheel head 12 is advanced to such a position that the second touch bar 19b faces the second grinding surface Gb, at step S31. By the process at steps S32 and S33, the table 14 is moved to the right until the second touch bar 19b contacts with the second grinding surface Gb. When the second touch bar 19b contacts with the second grinding surface Gb, the process moves from the step S33 to step S34 at which the table 14 is stopped and the present position of the table 14 is then memorized as position data Z1 indicating the position of the second grinding surface Gb. After this operation, the wheel head 12 is again advanced at step S35 to such a position that the second touch bar 19b faces the second reference surface RSb. By the process at steps S36 and S37, the table 14 is moved to the right until the second touch bar 19b contacts with the second reference surface RSb. When the second touch bar 19b contacts with the second reference surface RSb, the process moves from the step S37 to step S38 at which the table 14 is stopped and the present position of the table 14 is then memorized as position data Z2 indicating the position of the second reference surface RSb. At step S39, the first distance in X-axis direction between the first reference surface RSa and the first grinding surface Ga, and the second distance in Z-axis direction between the second reference surface RSb and the second grinding surface Gb are calculated by the following equation:

$$Se = X1 - X2$$

$$St = Z1 - Z2$$

As explained above, the above distances Se and St are memorized as the initial first distance $Se_0$ and initial second distance $St_0$ at step S1 in FIG. 5 (a).

Operation When Workpieces are Ground

The CPU 201 executes the process shown in FIG. 5 (b) for grinding plural workpieces. At first step S2, one workpiece is ground in accordance with a predetermined grinding cycle. After that, a parameter n indicating the number of workpieces which have been ground is incremented by one at step S3. At step S4, it is judged whether or not the value of the parameter n reaches a predetermined value A. The value A corresponds to the number of workpieces which can continuously be ground without dressing operation. When the value of parameter n is equal to A, the process moves from stop S4 to step S5 at which the first distance between the first reference surface RSa and the first grinding surface Ga, and the second distance between the second reference surface RSb and the second grinding surface Gb are detected. The detection of the first and second distances Se and St is carried out by the above mentioned process shown in FIGS. 6 (a) and 6 (b). At step S7, the detected distances Se and St are memorized as present distances $Se_1$ and $St_1$. At nest step S7, the wear amount me of the first grinding surface Ga and the wear amount of the second grinding surface Gb are calculated by the following equation to be memorized in the memory 202:

$$me = Se_0 - Se_1$$

$$mt = St_0 - St_1$$

At step S8, a first dressing amount de for dressing the first grinding surface Ga and a second dressing amount dt for dressing the second grinding surface Gb are determined based upon the following equation:

$$(mt + dt) \tan\theta = me + de$$

Namely, in the event that a preset value is used as the first dressing amount de, the second dressing amount dt is obtained by the following equation:

$$dt = \{(me + de)/\tan\theta\} - mt$$

where $\theta$ is the angle of the reference plane RP and the first grinding surface Ga.

At step S9, it is judged based upon the wear amounts obtained in step S7 whether or not the diameter of the grinding wheel G after dressing is within a predetermined usable range. When it is judged that the diameter of the grinding wheel G is out of the usable range, the process moves from step S9 to step S10 at which a message is displayed on the display device 23 which informs the operator that the grinding wheel G must be replaced with a new one.

When it is judged that the diameter of the grinding wheel G is within the usable range, the process moves from step S9 to step S11 at which the wheel head 12 and table 14 are moved so that the dressing tool 26 is moved along the loci 30 and 31 to remove the first and second grinding surfaces Ga and Gb by the first and second dressing amounts de and dt, respectively.

It is preferred that the dressing amounts de and dt be amounts larger than a few microns, because the grinding wheel containing CBN grains cannot be dressed properly when the dressing amount is too small.

After such dressing operation, the diameter D2 of the grinding wheel G after dressing is calculated by the following equation:

$$D2 = D0 - (mt + dt)/\cos\theta$$

where D0 is the initial diameter of the grinding wheel G.

At next step S12, it is judged whether or not any other workpieces are to be ground. When it is judged that there are other workpieces to be ground, the process moves back to step S2 to repeat above mentioned process to grinding other workpieces. When all the workpieces have been ground, the above mentioned process is stopped.

Figure 7:
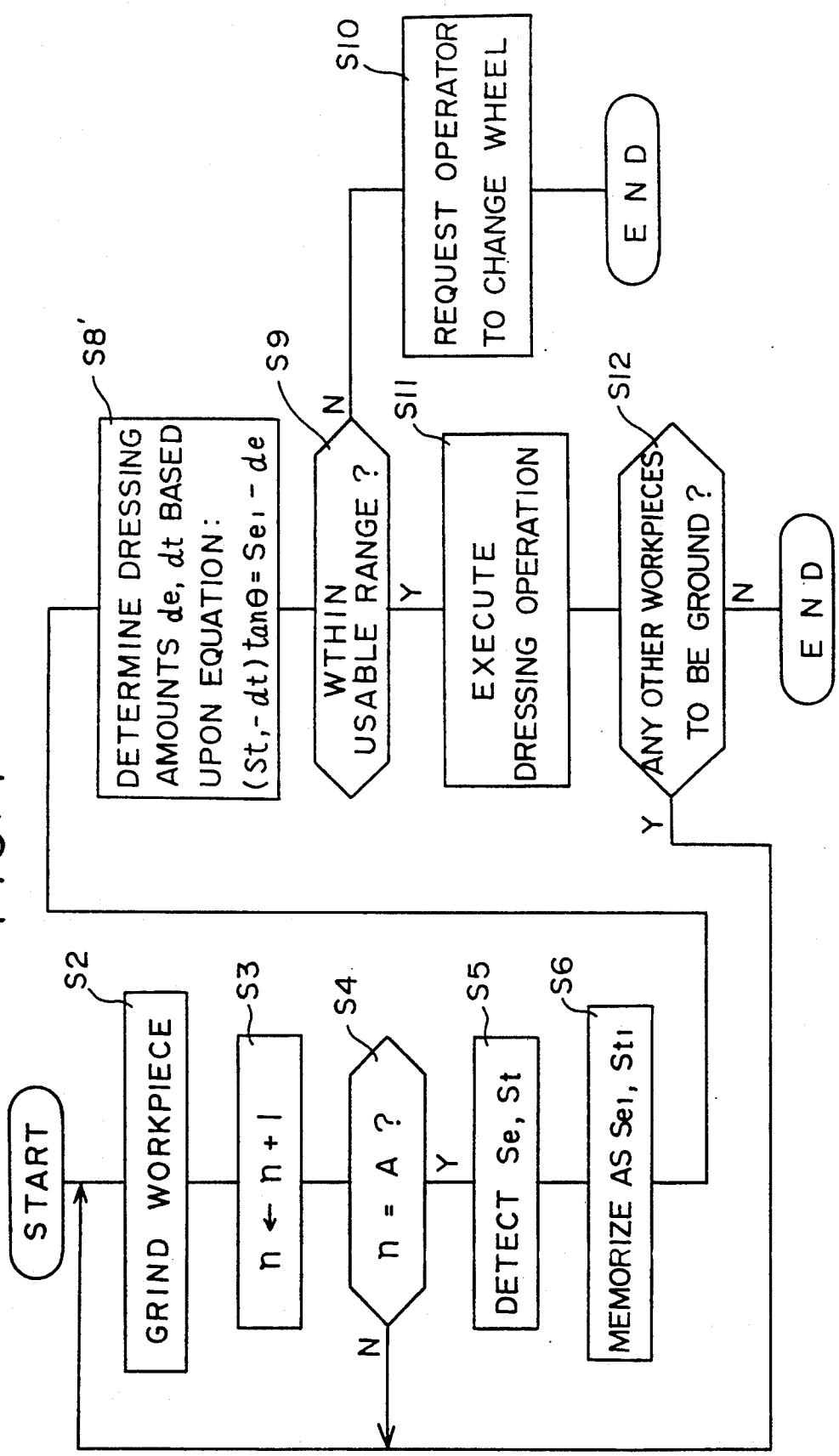
FIGS. 7 is a flow chart showing a second embodiment of the present invention.

FIG. 7 shows a flow chart according to the second embodiment of the present invention. In this embodiment, dressing amounts dt and de are determined based upon the following equation:

$$(St_1 - dt) \tan\theta = Se_1 - de$$

Namely, in the event that a preset value is used as the first dressing amount de, the second dressing amount dt is obtained, at step 8', by the following equation:

$$dt = St_1 - (Se_1 - de)/\tan\theta$$

The processes at other steps are the same as those of the flow chart shown in FIG. 4(b).

Obviously, numerous modifications and variations of the present invention are possible in light of the above teachings. It is therefore to be understood that within the scope of the appended claims, the present invention may be practiced otherwise than as specifically described herein.

What is claimed is:

1. A method of dressing an angular grinding wheel having a first grinding surface usable for grinding a cylindrical surface of a workpiece and a second grinding surface perpendicularly intersecting said first grinding surface and usable for grinding a shoulder end surface of said workpiece, said method comprising the steps of:
   providing on said grinding wheel first and second reference surfaces parallel to said first and second grinding surfaces, respectively;
   detecting a first distance between said first grinding surface and first reference surface, and a second distance between said second grinding surface and second reference surface, before dressing operation;
   determining, based upon said detected first and second distances, a first dressing amount for dressing said first grinding surface and a second dressing amount for dressing said second grinding surface so that said first distance and said second distance would have a predetermined constant relationship after dressing operation; and
   effecting relative movement between a dressing tool and said grinding wheel to dress said first grinding surface by said first dressing amount, and to dress the second grinding surface by said second dressing amount.

2. A method of dressing an angular grinding wheel according to claim 1, wherein said determining step comprises the steps of:
   subtracting said first distance from an initial first distance, which is a distance between said first grinding surface and said first reference surface measured when said grinding wheel is new, to obtain a first wear amount of said first grinding surface;
   subtracting said second distance from an initial second distance, which is a distance between said second grinding surface and said second reference surface measured when said grinding wheel is new, to obtain a second wear amount of said second grinding surface;
   determining said first dressing amount and said second dressing amount based upon the following equation:

$$(mt + dt)\tan\theta = me + de$$

where me is said first wear amount, de is said first dressing amount, mt is said second wear amount, dt is said second dressing amount, and $\theta$ is an angle between a plane in which the top portion of said grinding wheel lies and said first grinding surface.

3. A method of dressing an angular grinding wheel according to claim 1, wherein said determining step comprises the step of:
   determining said first dressing amount and said second dressing amount based upon the following equation:

$$(St_1 - dt)\tan\theta = Se_1 - de$$

where $Se_1$ is said first distance, de is said first dressing amount, $St_1$ is said second distance, dt is said second dressing amount, and $\theta$ is an angle between a plane in which the top portion of said grinding wheel lies and said first grinding surface.

4. An apparatus for dressing an angular grinding wheel carried on a wheel head and having a first grinding surface usable for grinding a cylindrical surface of a workpiece and a second grinding surface perpendicularly intersecting said first grinding surface and usable for grinding a shoulder end surface of said workpiece, wherein said grinding wheel is provided with first and second reference surfaces parallel to said first and second grinding surfaces, respectively, and said apparatus comprises:
   a dressing tool supported on a table which is movable in a direction intersecting the moving direction of said wheel head;
   a touch member disposed on said table and being engagable with said first and second grinding surfaces and said first and second reference surfaces;
   means for effecting relative movement between said wheel head and said table so as to contact said touch member with said first grinding surface, said first reference surface, said second grinding surface and said second reference surface, successively;
   means for detecting positions of said table and said wheel head when said touch member contact with said first grinding surface, said first reference surface, said second grinding surface and said second reference surface so as to obtain a first distance between said first grinding surface and first reference surface, and a second distance between said second grinding surface and second reference surface, before dressing operation;
   means for determining a first dressing amount for dressing said first grinding surface and a second dressing amount for dressing said second grinding surface so that said first distance and said second distance would have a predetermined constant relationship after dressing operation; and
   means for effecting relative movement between said wheel head and said table to dress said first grinding surface by said first dressing amount, and to dress the second grinding surface by said second dressing amount.

5. An apparatus for dressing an angular grinding wheel according to claim 4, wherein said determining means comprises:
   means for subtracting said first distance from an initial first distance, which is a distance between said first grinding surface and said first reference surface measured when said grinding wheel is new, to obtain a first wear amount of said first grinding surface;
   means for substracting said second distance from an initial second distance, which is a distance between said second grinding surface and said second reference surface measured when said grinding wheel is new, to obtain a second wear amount of said second grinding surface;

means for calculating said first dressing amount and said second dressing amount based upon the following equation:

$$(mt + dt) \tan \theta = me + de$$

where me is said first wear amount, de is said first dressing amount, mt is said second wear amount, dt is said second dressing amount, and $\theta$ is an angle between a plane in which the top portion of said grinding wheel lies and said first grinding surface.

6. An apparatus for dressing an angular grinding wheel according to claim 4, wherein said determining means comprises:

means for calculating said first dressing amount and said second dressing amount based upon the following equation:

$$(St_1 - dt) \tan \theta = Se_1 - de$$

where $Se_1$ is said first distance, de is said first dressing amount, $St_1$ is said second distance, dt is said second dressing amount, and $\theta$ is an angle between a plane in which the top portion of said grinding wheel lies and said first grinding surface.

* * * * *